(12) United States Patent
Lee et al.

(10) Patent No.: US 9,507,931 B2
(45) Date of Patent: Nov. 29, 2016

(54) SECURITY DEVICE AND CONTROLLING METHOD THEREOF

(71) Applicant: SAMSUNG ELECTRONICS CO., LTD., Suwon-si (KR)

(72) Inventors: Byong-ki Lee, Suwon-si (KR); Yun-ho Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 14/495,326

(22) Filed: Sep. 24, 2014

(65) Prior Publication Data
US 2015/0229632 A1 Aug. 13, 2015

(30) Foreign Application Priority Data

Feb. 10, 2014 (KR) .......................... 10-2014-0015134

(51) Int. Cl.
*H04L 29/06* (2006.01)
*G06F 21/46* (2013.01)
(52) U.S. Cl.
CPC .................................... *G06F 21/46* (2013.01)
(58) Field of Classification Search
CPC . H04L 63/20; H04L 63/145; H04L 63/1441; H04L 63/168; G06F 21/53; G06F 21/56; G06F 21/51; G06F 2221/033
See application file for complete search history.

(56) References Cited

U.S. PATENT DOCUMENTS

| 7,444,668 | B2 | 10/2008 | Moyer et al. |
| 7,461,407 | B2 | 12/2008 | Little et al. |
| 8,489,888 | B2 | 7/2013 | Lim |
| 2005/0066308 | A1 | 3/2005 | Han |
| 2006/0259828 | A1 | 11/2006 | Swoboda |
| 2009/0228977 | A1* | 9/2009 | Lee ........................ H04L 9/3226 726/18 |
| 2010/0199077 | A1 | 8/2010 | Case et al. |
| 2012/0278630 | A1 | 11/2012 | Little et al. |
| 2013/0070278 | A1* | 3/2013 | Cochran ............. G06K 15/4095 358/1.14 |
| 2014/0283119 | A1* | 9/2014 | Sandri ..................... G06F 21/76 726/28 |

FOREIGN PATENT DOCUMENTS

| KR | 10-2005-0028465 A | 3/2005 |
| KR | 10-2009-0095843 A | 9/2009 |
| KR | 10-2011-0068498 A | 6/2011 |

* cited by examiner

*Primary Examiner* — Andrew Nalven
*Assistant Examiner* — Mary Li
(74) *Attorney, Agent, or Firm* — Sughrue Mion, PLLC

(57) ABSTRACT

A security device and controlling method thereof are provided. The security device includes: a storage configured to store a plurality of passwords, wherein a complexity of the passwords increases according to a security level; an inputter configured to receive a password input by a user; a detector configured to detect a security level of the received password by comparing the received password and the plurality of passwords stored in the storage; and a controller configured to provide an authority to access an element of an electronic device connected with the security device according to the detected security level.

17 Claims, 8 Drawing Sheets

SECURITY DEVICE AND CONTROLLING METHOD THEREOF

CROSS-REFERENCE TO RELATED APPLICATION(S)

This application claims priority from Korean Patent Application No. 10-2014-0015134, filed on Feb. 10, 2014 in the Korean Intellectual Property Office, the entire disclosure of which is hereby incorporated by reference.

BACKGROUND

1. Field

Apparatuses and methods consistent with exemplary embodiments relate to a security device and a controlling method thereof, and more particularly, to a security device which differently gives a user an authority to access an element of an electronic device connected with the security device, and a controlling method thereof.

2. Description of the Related Art

For an electronic device including elements like a memory and a processor, it becomes more important to maintain security of the electronic device by preventing unauthorized access of the elements. For example, someone who tries to access the elements of the electronic device without permission of a rightful user in order to steal and falsify data stored in the memory and change operations of the processor like a hacker should be prevented from accessing the elements.

In a related-art method, such an unauthorized group could have accessed each element of the electronic device via a debugging interface such as a Joint Test Action Group (JTAG), for example. In order to prevent a misuse of the debugging interface by the unauthorized group, a method of disabling the debugging interface permanently after a product is released from a factory or a method of allowing only a group which is authorized by a password to use the debugging interface has been suggested in recent years.

However, the method of permanently disabling the debugging interface makes it impossible to perform a debugging operation when a problem arises in the processor, and does not provide an alternative means. In addition, the method of using the password enables a user to enter a debugging mode with a single password and the user who obtains a debugging authority may debug all elements limitlessly regardless of necessity to access each element of the electronic device. This may reduce the security level.

Accordingly, as a method for maintaining security by restricting access to the electronic device including elements like the memory and the processor by using the password, there is a demand for a method for maintaining a security level by differently giving a user an authority to access each element of the electronic device.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a security device which can differently provide an authority to access an element of an electronic device connected with the security device according to a security level, and a controlling method thereof.

According to an aspect of an exemplary embodiment, there is provided a security device including: a storage configured to store a plurality of passwords which have their complexity increased according to a security level; an inputter configured to receive a password input by a user; a detector configured to detect a security level of the received password by comparing the received password and the plurality of passwords stored in the storage; and a controller configured to provide an authority to access an element of an electronic device connected with the security device according to the detected security level.

A number of bits of the password may increase as the security level increases.

The password may include a tag bit indicating a security level and a password bit indicating a password corresponding to the security level.

The password may include a tag bit of n bits and a password bit of at least m bits, and a number of bits of the password bit may increase by m bits for each increase of the security level.

As the security level increases, the controller may increase a number of elements which are accessible from among a plurality of elements of the electronic device connected with the security device, and may provide the authority to access the elements.

In response to the detected security level being a first security level, the controller may provide an authority to access a first element from among the plurality of elements of the electronic device connected with the security device, and, in response to the detected security level being a second security level which is higher than the first security level, the controller may provide an authority to access the first element and a second element from among the plurality of elements of the electronic device connected with the security device.

The controller may include a switch configured to connect the security device and an element of the electronic device, and the controller may control the switch to provide an access authority according to the detected security level.

The security device may be implemented as a system on chip {SOC).

According to an aspect of another exemplary embodiment, there is provided a controlling method of a security device including: receiving a password input by a user; detecting a security level of the received password by comparing the received password and a plurality of passwords which have their complexity increased according to a security level and which are pre-stored; and providing an authority to access an element of an electronic device connected with the security device according to the detected security level.

A number of bits of the password may increase as the security level is higher.

The password may include a tag bit indicating a security level and a password bit indicating a password corresponding to the security level.

The password may include a tag bit of n bits and a password bit of at least m bits, and a number of bits of the password bit may increase by m bits for each increase of the security level.

The providing the access authority may include, as the security level increases, increasing a number of elements which are accessible from among a plurality of elements of the electronic device connected with the security device and providing the access authority.

The providing the access authority may include, in response to the detected security level being a first security level, providing an authority to access a first element from among the plurality of elements of the electronic device connected with the security device, and, in response to the detected security level being a second security level which is higher than the first security level, providing an authority to access the first element and a second element from among the plurality of elements of the electronic device connected with the security device.

The providing the access authority may include controlling a switch configured to connect the security device and an element of the electronic device to provide the access authority according to the detected security level.

The security device may be implemented as an SOC.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
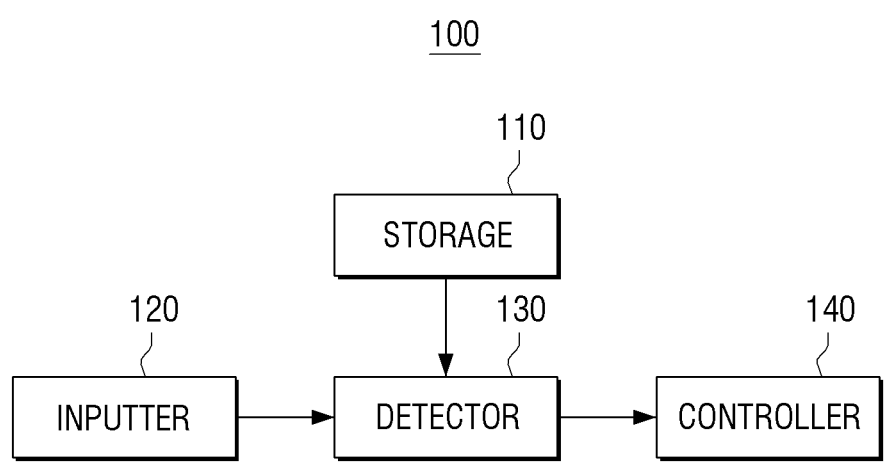
FIG. 1 is a block diagram illustrating a configuration of a security device according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a security device according to an exemplary embodiment. Referring to FIG. 1, the security device 100 according to an exemplary embodiment includes a storage 110, an inputter 120, a detector 130, and a controller 140.

The storage 110 may store a plurality of passwords which have their complexity increased according to a security level. To achieve this, the storage 110 may be implemented by a non-volatile memory, which retains record even in response to power supply being shut off, that is, by using a Read Only Memory (ROM). However, the ROM is not limited to a MASK ROM or a Programmable ROM (PROM). The ROM may be implemented by using an Erasable PROM (EPROM) or an Electrically EPROM (EEPROM) to be able to update or change the passwords.

The password stored in the storage 110 may have its complexity increased according to a security level. The "security level" as used herein refers to a level of an authority to access an element of an electronic device connected with the security device 100. Accordingly, as the security level increases, the authority to access the element of the electronic device increases. For example, as the security level of the password is higher, the security device 100 gives the authority to access more elements of the electronic device connected with the security device 100.

In addition, as the security level of the password is higher, the complexity of the password increases. The complexity recited herein refers to how the password is complex. The complexity may be increased by adding a type of characters forming the password or by increasing the number of characters forming the password as the security level becomes higher.

Specifically, a password of a low security level may consist of only numbers. As the security level of the password is higher, the complexity of the password may be increased by adding letters, space(s), sign(s), etc. to the characters forming the password. In addition, when a password having the low security level consists of m characters (where m is a number of characters), the complexity may be increased by increasing the number of characters forming the password to 2*m or 3*m as the security level of the password is higher. However, the method for increasing the complexity as the security level of the password is higher is not limited to the above-described method.

Figure 2:
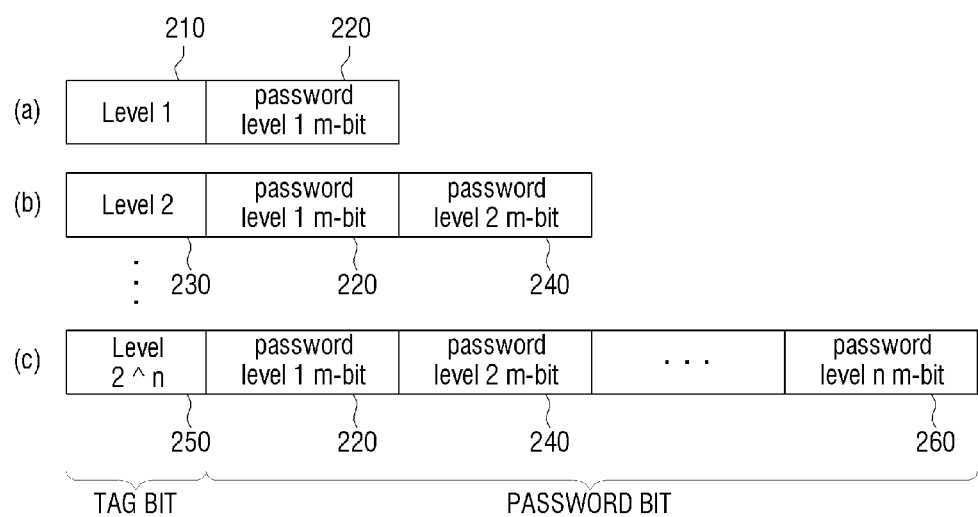
FIG. 2 is a view illustrating configurations of passwords according to an exemplary embodiment.

Hereinafter, a detailed configuration of a password according to an exemplary embodiment will be explained with reference to FIG. 2 and then the other elements of the security device 100 will be explained. FIG. 2 illustrates a detailed example of passwords which have their complexity increased by increasing the number of bits forming the passwords as the security level is higher.

Referring to FIG. 2, the password includes a tag bit or portion indicating a security level and a password bit or portion indicating a password corresponding to the security level. The number of bits forming the password increases from the password of level 1 (password (a) of FIG. 2) to the password of level $2^n$ (password (c) of FIG. 2).

Specifically, password (a) of FIG. 2 is a password of level 1 which is the lowest security level. The password of level 1 includes a tag bit 210 of n bits indicating that the security level is 1, and a password bit 220 of m bits indicating a password corresponding to level 1.

Password (b) of FIG. 2 is a password of level 2 which is higher than password (a) of FIG. 2 by one level. The password of level 2 includes a tag bit 230 indicating that the security level is 2 and password bits 220 and 240. However, it can be seen that as the security level increases by one level, the number of bits of the password bit increases by m bits to increase the complexity of the password. That is, by adding the password bit 240 of m bits indicating the password corresponding to level 2 to the password bit 220 of level 1, the complexity is increased in comparison with that of the password of level 1.

In this way, the complexity may be increased by increasing the number of bits of the password bit by m bits every time the security level increases by one level.

Since the number of bits of the tag bit is 'n' in the example of FIG. 2, as many as $2^n$ security levels can be designated. Password (c) of FIG. 2 indicates a password of level $2^n$ which is the highest security level. The password of level $2^n$ includes a tag bit 250 indicating that the security level is $2^n$, and password bits in which a password bit 260 indicating a password corresponding to level $2^n$ is added to password bits of level $2^n-1$.

Accordingly, according to the configuration of the password according to the exemplary embodiment, as many security levels as needed can be designated by adjusting the number of tag bits indicating the security level, and the number of bits of the password increases by m bits as the security level increases, so that the complexity of the password increases.

Although the number of bits of the password bit of the password progressively increases by m bit in the example of FIG. 2, this is merely an example. The method for increasing the number of bits as the security level increases is not limited to the above-described method.

The inputter 120 is configured to receive the password from the user. Specifically, the inputter 120 may receive the password which is input by the user to access the element of the electronic device connected with the security device 100.

In addition, the inputter 120 may temporarily store the password received from the user and transmit the password to the detector 130 such that the detector 130 compares the password input by the user and the passwords stored in the storage 110. To achieve this, the inputter 120 may include, for example, a register.

The detector 130 may determine whether the password input by the user is identical to a password stored in the storage 110 by comparing the password input through the inputter 120 and the plurality of passwords stored in the storage 110. In particular, the detector 130 may detect the security level of the password input by the user by comparing the password input through the inputter 120 and the plurality of passwords stored in the storage 110. To achieve this, the detector 130 may include a comparator.

Specifically, according to the exemplary embodiment described above with reference to FIG. 2, the password includes the tag bit indicating the security level and the password bit indicating the password corresponding to the security level. Therefore, the detector 130 may detect the security level by reading out the tag bit of the password input through the inputter 120, and may determine whether the password bit is identical to a pre-stored password bit by reading out the password bit. In addition, the detector 130 may transmit the security level and the result of the determining of the password to the controller 140.

Operation of the detector 130 will be explained in detail with reference to FIGS. 3A and 3B which are flowcharts to illustrate a method for the security device 100 to detect a security level in response to a password being input by the user and determine whether the password is identical to a pre-stored password.

Figure 3A:
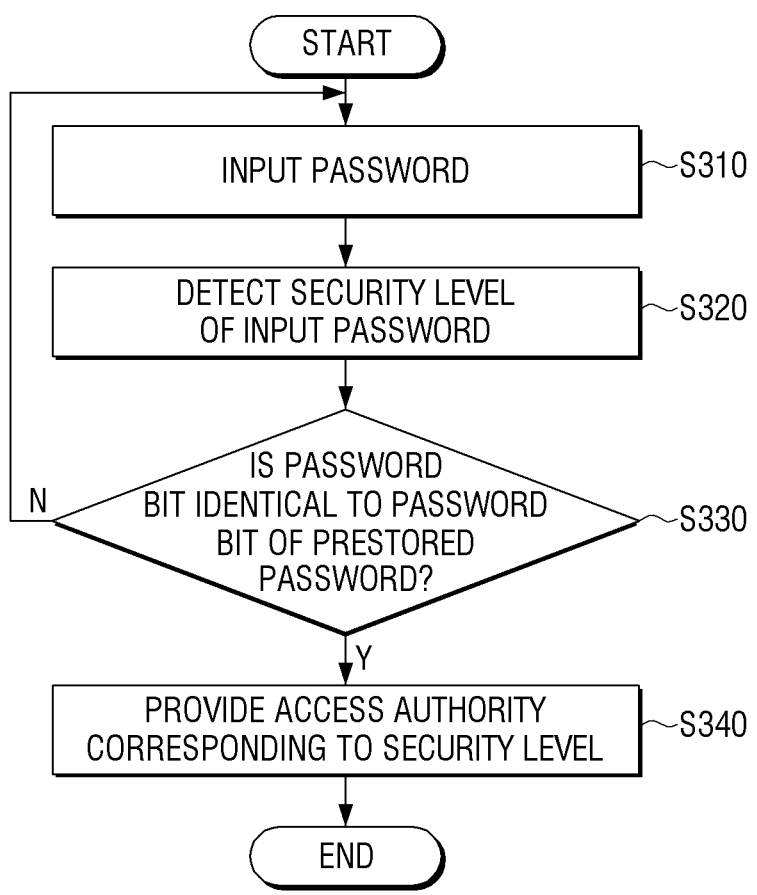
FIGS. 3A and 3B are flowcharts to illustrate an operation of a security device performed in response to a password being input according to an exemplary embodiment.

Referring to FIG. 3A, in response to a password being input through the inputter (S310), the detector 130 may detect a security level by reading out a tag bit of the input password (S320). Specifically, the detector 130 may detect the security level of the input password by comparing the tag bit of the input password and the tag bit of the passwords stored in the storage 110. However, the method utilized by the detector 130 to detect the security level is not limited to this method. For example, the detector 130 may be configured to detect the security level by reading out the tag bit of the input password without comparing the read tag bit with the tag bit of the passwords stored in the storage 110.

Next, the detector 130 may determine whether the password bit of the input password is identical to a password bit of a password corresponding to the detected security level from among the passwords stored in the storage 110 by comparing the password bits (S330), and, when the password bits are identical to each other (S330, Y), the detector 130 transmits the result of the determining to the controller 140 and the controller 140 provides the user with an authority to access an element of the electronic device according to the security level (S340). When the password bits are not identical to each other (S330, N), the user is not provided with the authority to access the element of the electronic device.

Figure 3B:
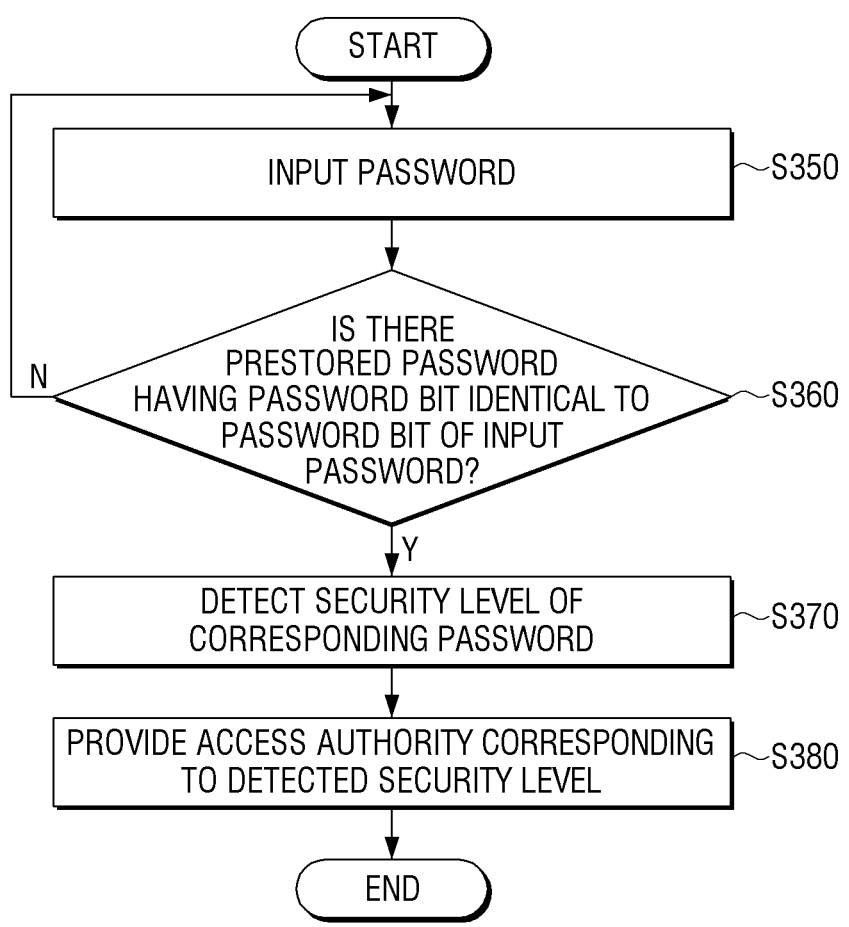

According to another exemplary embodiment, referring to FIG. 3B, in response to a password being input through the inputter 120 (S350), the detector 130 determines whether there is a password having a password bit identical to the password bit of the input password from among a plurality of passwords stored in the storage 110 by comparing the password bits (S360).

In response to determining that there is a password having the identical password bit (S360, Y), the detector 130 detects a security level of a tag bit of the corresponding password as a security level of the input password (S370), and transmits a result of the detecting to the controller 140. Accordingly, the controller 140 may provide the user with an authority to access an element of the electronic device according to the detected security level (S380). When there is no password with the identical password bit (S360, N), the security level of the input password is not detected (S380).

The operations of detecting the security level and determining whether there is a password with the identical password bit are performed in order in FIGS. 3A and 3B. However, the method utilized by the detector 130 to detect the security level and determine whether there is a password with the identical password bit is not limited to the above-described method. For example, in response to the password being input, the operation of detecting the security level and the operation of determining whether there is a password with the identical password bit may be performed simultaneously by reading out the number of bits of the input password and comparing the input password and a password which has the corresponding number of bits and is stored in the storage 110.

As described above, the detector 130 may detect the security level and may determine whether there is a password with identical the password bit by comparing the password input through the inputter 120 and the plurality of passwords stored in the storage 110.

The controller 140 is configured to provide the authority to access an element of the electronic device connected with the security device 100. In particular, the controller 140 may provide the user who input the password with the authority to access the element of the electronic device according to the security level detected by the detector 130. To achieve this, the controller 140 may include, for example, a switch.

In addition, the controller 140 may increase the number of elements which are accessible from among the plurality of elements of the electronic device connected with the security device 100 as the security level detected by the detector 130 increases. That is, a higher security level may allow the user to access more elements than a lower security level.

Hereinafter, the configuration and operation of the controller 140 will be explained in detail with reference to FIG. 4 which illustrates the security device 100 and an electronic device 410 connected with the security device 100 according to an exemplary embodiment. Explanation of the elements which have been already described from among the elements of the security device 100 will be omitted.

Figure 4:
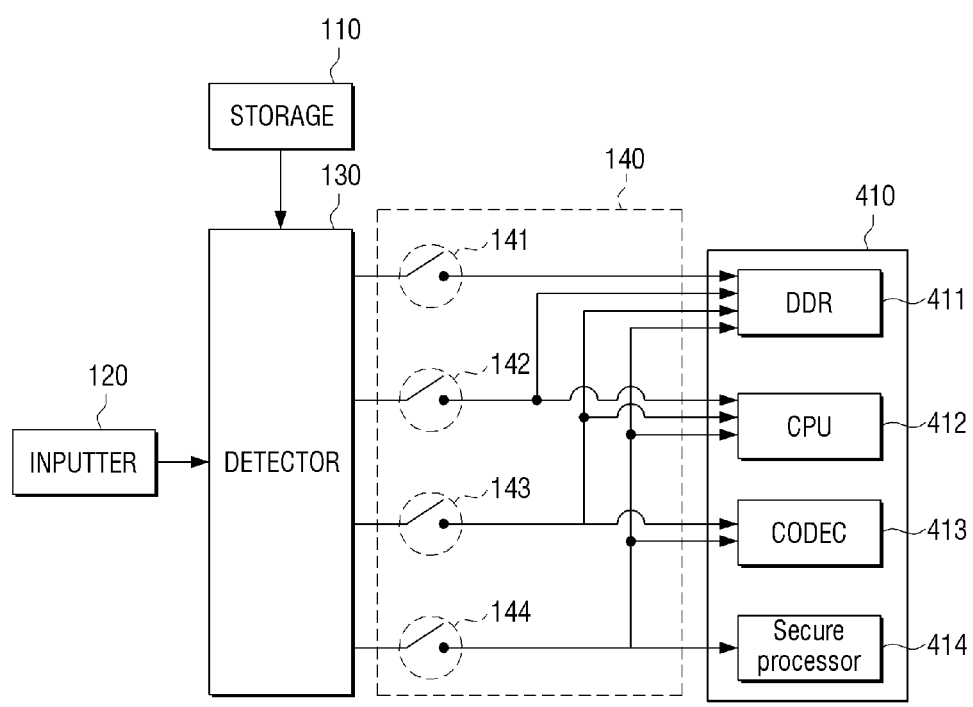
FIG. 4 is a view illustrating a detailed configuration and operation of a controller according to an exemplary embodiment.

Referring to FIG. 4, the controller 140 of the security device 100 includes switches 141 to 144. In addition, the electronic device 410 connected with the security device 100 includes a Double Data Rate (DDR) memory 411, a Central Processing Unit (CPU) 412, a coder/decoder (CODEC) 413, and a secure processor 414.

In particular, referring to the switches 141 to 144 of the controller 140, the number of elements connected with each switch 141 to 144 may vary. That is, the number of elements of the electronic device 410 which is accessible by the user through the security device 100 may vary.

Specifically, the user can access the DDR memory 411 of the electronic device 410 through the first switch 141, access the DDR memory 411 and the CPU 412 through the second switch 142, access the DDR memory 411, the CPU 412, and the CODEC 413 through the third switch 143, and access all of the elements of the electronic device 410 including the DDR memory 411, the CPU 412, the CODEC 413, and the secure processor 414 through the fourth switch 144.

Accordingly, in the example of FIG. 4, in response to a password corresponding to a security level 1 being input through the inputter 120, the detector 130 detects the security level as level 1 by comparing the input password and the passwords stored in the storage 110, and the controller 140 controls the first switch 141 to connect to the DDR memory 411 from among the elements of the electronic device 410, thereby providing the user with the access authority according to the security level 1. Likewise, in response to passwords corresponding to security levels 2, 3, and 4 being input through the inputter 120, the controller 140 controls the second, third, and fourth switches 142, 142, and 144 to provide the user with the authority to access the elements of the electronic device 410 according to each security level.

Referring to FIG. 4, as the security level is increases, the number of elements of the electronic device 410 which are accessible increases. That is, the elements of the electronic device 410 which are accessible at a high security level may include the elements which are accessible at a security level lower than the high security level.

That is, according to an exemplary embodiment, the elements of the electronic device 410 which are accessible at the high security level include the elements of the electronic device 410 which are accessible at the low security level, and may further include the element which is not accessible at the low security level.

This can be estimated based on the form of the password according to the exemplary embodiment described with reference to FIG. 2. Referring to FIG. 2, as the security level increases by one level, a password bit of m bits indicating the password corresponding to the security level is added and thus complexity increases. Therefore, the password bits of the high security level include the password bit of the low security level.

Accordingly, the element of the electronic device which is accessible at the low security level can be accessed at the high security level. In addition, it can be seen from other password configurations of the example of FIG. 2 that another element of the electronic device which is not accessible at the low security level corresponding to the password bit of the high security level can be accessed at the high security level.

In the example of FIG. 4, the security level is divided into four levels. However, the security level may be divided into as many levels as needed by adjusting the number of tag bits of the password according to the number of elements of the electronic device as described above. The configuration of the controller 140 including the switches 141 to 144 as shown in FIG. 4 is merely an example. Other configurations of the controller 140 for providing the authority to access the elements of the electronic device according to the security level may be provided.

In the above-described example, as the security level increases, the controller 140 increases the number of elements which are accessible from among the plurality of elements of the electronic device connected with the security device. However, the method for the controller 140 to provide the authority to access the elements of the electronic device connected with the security device according to the security level is not limited to the above-described method.

For example, the security levels may be more specifically divided. At the low security level, the user may be allowed only to read out data from the element of the electronic device, and at the high security level, the user may be allowed to read out data from the element and write data onto the element. That is, in the example of FIG. 4, the security level 1 may be divided into two levels, and, at the low security level, the user may be allowed only to read out data from the DDR memory 411, and, at the high security level, the user may be allowed to read out data from the DDR memory 411 and write data onto the DDR memory 411. The other security levels 2, 3, and 4 may be configured in the above-described method. In this case, the configuration of the controller 140 may be different from that of FIG. 4.

In FIG. 4, as the security level increases, the number of elements which are accessible from among the elements of the electronic device connected with the security device increases. For example, the elements of the electronic device which are accessible at the high security level include the elements of the electronic device which are accessible at the low security level. However, this should not be considered as limiting.

For example, the security device 100 may be configured to access the DDR memory 411 of the electronic device 410 at the security level 1, to access the CPU 412 and the CODEC 413 at the security level 2 unlike in the above-described example, to access the DDR memory 411, the CODEC 413, and the secure processor 414 at the security level 3, and to access all of the elements 411 to 414 at the security level 4. That is, the number of elements of the electronic device which are accessible at the high security level is more than the number of elements of the electronic device which are accessible at the low security level, but the access authority may be provided in a predetermined method according to an exemplary embodiment. In this case, the form of the password and the configuration of the controller 140 may be changed accordingly.

The security device 100 may be implemented in the form of a System On Chip (SOC). Specifically, since the security device 100 according to an exemplary embodiment includes the inputter 120 including the register, the storage 110, the detector 130 including the comparator, and the controller 140 including the switches, the security device 100 may be implemented as a single chip.

In addition, when the security device 100 is implemented in the form of the SOC, only the security device 100 is implemented in the form of the SOC or the security device 100 and the electronic device may be implemented in the form of a single SOC.

Figure 5A:
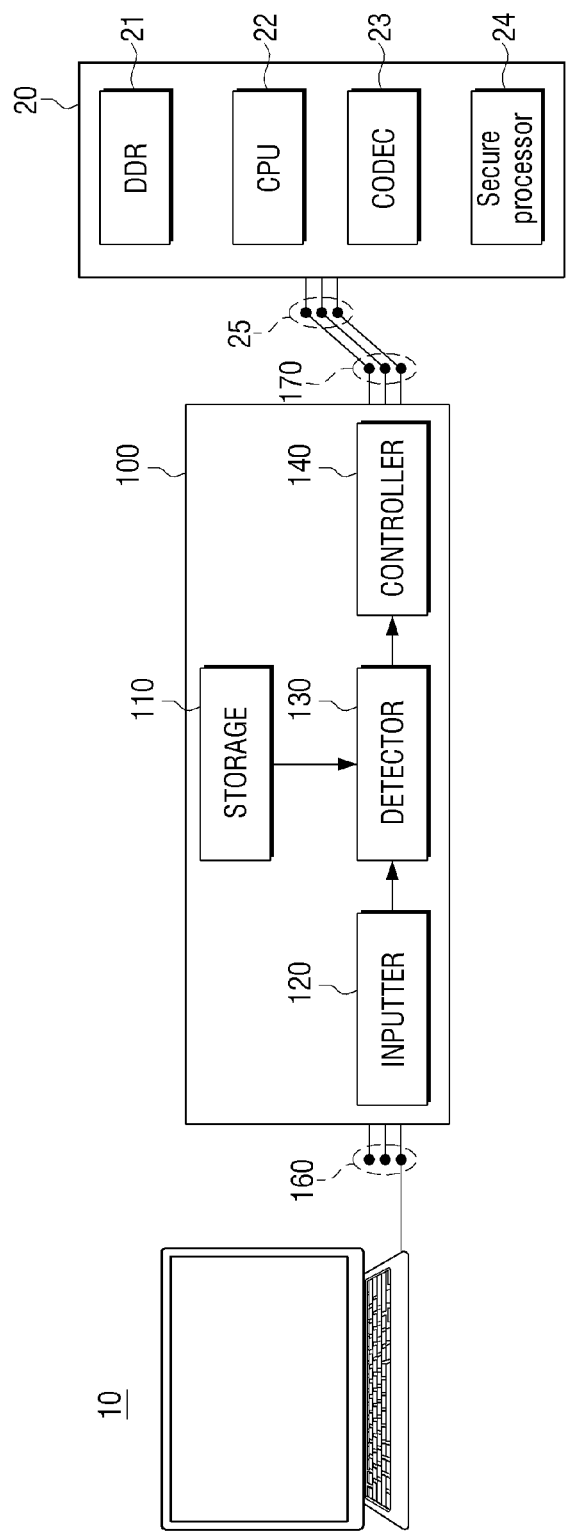
FIGS. 5A and 5B are views illustrating a security device according to various exemplary embodiments.
Figure 5B:
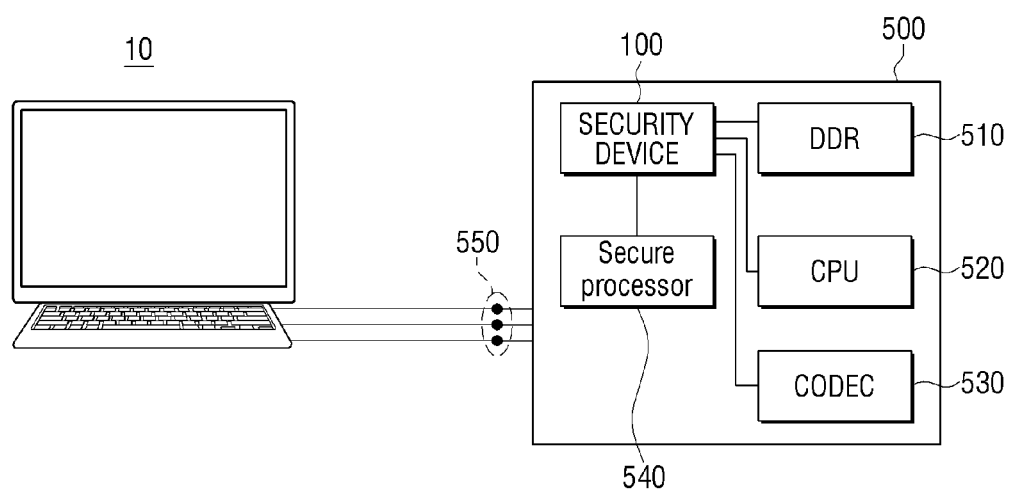

FIGS. 5A and 5B illustrate the security device 100 which is implemented in the form of the SOC according to various exemplary embodiments. Specifically, FIG. 5A illustrates a method for debugging an electronic device 20 connected with the security device 100 by using the security device 100 implemented in the form of the SOC.

In the exemplary embodiment of FIG. 5A, the electronic device 20 is implemented as an SOC including the elements 21 to 24. In order to debug the SOC in the process of developing the electronic device 20 of the SOC form or performing a repairing process, a debugging port of the electronic device 20 may be used.

Referring to FIG. 5A, the debugging port 25 of the electronic device 20 is connected with a connection port 170 of the security device 100 of the SOC form. In addition, the security device 100 is connected with a computer 10 through a connection port 160 to debug the electronic device 20 through the computer 10.

Accordingly, the user may input a password through the computer 10 and may debug an element of the electronic device 20 corresponding to a corresponding security level. Specifically, in response to the user executing a script corresponding to the password on the computer or directly inputting the password, the detector 130 of the security device 100 detects the security level and accordingly the controller 140 provides the user with the authority to access the element of the electronic device 20 corresponding to the detected security level, so that the user can debug the element of the electronic device 20.

FIG. 5B illustrates an exemplary embodiment in which the security device 100 according to an exemplary embodiment is implemented as a single SOC 500 along with a DDR 510, a CPU 520, a CODEC 530, and a pressure sensor 540 of the electronic device. Since the security device 100 is implemented as the single SOC 500 along with the DDR 510, the CPU 520, a CODEC 530, and the pressure sensor 540 of the electronic device in the example of FIG. 5B unlike in FIG. 5A, only a single debugging port 550 for debugging is required.

Accordingly, in response to the user inputting a password through a computer 10, the security device 100 according to an exemplary embodiment detects a security level and provides the user with the authority to access the elements 510 to 540 corresponding to the detected security level. Accordingly, the user can debug the element corresponding to the security level.

Figure 6:
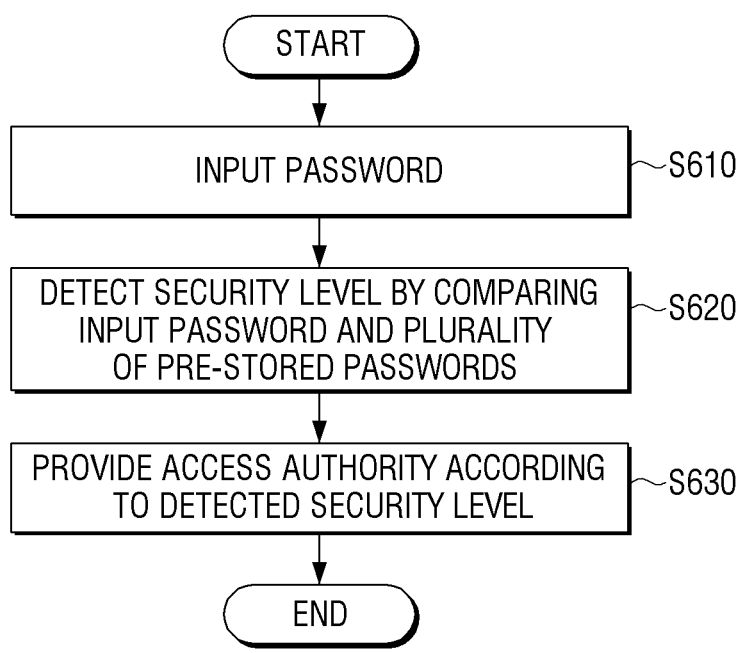
FIG. 6 is a flowchart illustrating a controlling method of a security device according to an exemplary embodiment.

FIG. 6 is a flowchart illustrating a controlling method of a security device according to an exemplary embodiment. Referring to FIG. 6, in response to the user inputting a password through the inputter 120 (S610), the detector 130 may detect a security level by comparing the input password and a plurality of passwords stored in the storage 110 (S620). Thereafter, the controller 140 may provide the user with the authority to access an element of the electronic device connected with the security device 100 according to the detected security level (S630).

According to the various exemplary embodiments as described above, the authority to access the element of the electronic device connected with the security device can be provided differently according to the security level and thus it is easy to manage the security of the electronic device. Since the length of the password becomes longer as the security level is higher, the security effect can be improved.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A security device comprising:
a storage configured to store passwords, wherein a complexity of each of the passwords increases according to a respective security level; and
at least one processor to implement:
a detector configured to receive a password input by a user, and detect a first security level of the received password by comparing the received password and each of the passwords stored in the storage; and
a controller configured to provide an authority to access an element of an electronic device connected with the security device according to the detected first security level,
wherein the received password comprises a first tag bit indicating the first security level and a first password bit indicating a first password corresponding to the first security level, and
the detector is further configured to:
compare the first password bit of the received password and each of password bits of the passwords stored in the storage; and
in response to a determination based on the comparison that there is, among the passwords stored in the storage, another password having a second password bit that is identical to the first password bit of the received password, detect a second security level of a second tag bit of the other password as the first security level of the received password.

2. The security device of claim 1, wherein the received password comprises a number of bits, and
the number of the bits of the received password increases as the first security level increases.

3. The security device of claim 1, wherein the received password comprises the first tag bit of n bits and the first password bit of at least m bits, and
a number of bits of the received password bit increases by m bits for each increase of the first security level.

4. The security device of claim 2, wherein the controller is further configured to, as the first security level increases, increase a number of elements accessible among elements of the electronic device connected with the security device, and provide an authority to access the elements.

5. The security device of claim 4, wherein the controller is further configured to:
in response to the detected first security level being a first level, provide an authority to access a first element among the elements of the electronic device connected with the security device; and
in response to the detected first security level being a second level higher than the first security level, provide an authority to access the first element and a second element among the elements of the electronic device connected with the security device.

6. The security device of claim 2, wherein the controller comprises a switch configured to connect the security device and the element of the electronic device, and
the controller is further configured to control the switch to provide the authority to access the element according to the detected first security level.

7. The security device of claim 1, wherein the security device is implemented as a system on chip.

8. A method of controlling a security device, the method comprising:
receiving a password input by a user;
detecting a first security level of the received password by comparing the received password and each of passwords that are pre-stored, wherein a complexity of each of the passwords increases according to a respective security level; and providing an authority to access an element of an electronic device connected with the security device according to the detected first security level, wherein the received password comprises a first tag bit indicating the first security level and a first password bit indicating a first password corresponding to the first security level, and the detecting the first security level of the received password comprises:

comparing the first password bit of the received password and each of password bits of the pre-stored passwords; and in response to determining based on the comparing that there is, among the pre-stored passwords, another password having a second password bit that is identical to the first password bit of the received password, detecting a second security level of a second tag bit of the other password as the first security level of the received password.

9. The method of claim 8, wherein the received password comprises a number of bits, and the number of the bits of the received password increases as the first security level increases.

10. The method of claim 8, wherein the received password comprises the first tag bit of n bits and the first password bit of at least m bits, and a number of bits of the received password bit increases by m bits for each increase of the first security level.

11. The method of claim 9, wherein the providing the authority to access the element comprises, as the first security level increases, increasing a number of elements accessible among elements of the electronic device connected with the security device, and providing an authority to access the elements.

12. The method of claim 11, wherein the providing the authority to access the element comprises:

in response to the detected first security level being a first level, providing an authority to access a first element among the elements of the electronic device connected with the security device; and in response to the detected first security level being a second level higher than the first security level, providing an authority to access the first element and a second element among the elements of the electronic device connected with the security device.

13. The method of claim 9, wherein the providing the authority to access the element comprises controlling a switch configured to connect the security device and the element of the electronic device to provide the authority to access the element according to the detected first security level.

14. The method of claim 8, wherein the security device is implemented as a system on chip.

15. A method of controlling a security device, the method comprising:

receiving a password input by a user, the password comprising a first portion comprising a first number of bits indicating a first security level and a second portion comprising a second number of bits indicating a first password corresponding to the first security level;

detecting the first security level of the received password by comparing the received password with each of passwords that are stored in the security device; and providing an authority to access an element of an electronic device connected with the security device according to the detected first security level, wherein the detecting the first security level of the received password comprises:

comparing the second portion of the received password and each of second portions of the passwords stored in the security device; and in response to determining based on the comparing that there is, among the passwords stored in the security device, another password having another second portion that is identical to the second portion of the received password, detecting a second security level of a another first portion of the other password as the first security level of the received password.

16. The method of claim 15, wherein the detecting the first security level of the received password comprises comparing the first portion of the received password with each of first portions of the passwords stored in the security device, and the providing the authority to access the element of the electronic device comprises:

comparing the second portion of the received password and each of the second portions of the passwords stored in the security device; and providing the authority to access the element of the electronic device in response to the determining based on the comparing that there is, among the passwords stored in the security device, the other password having the other second portion that is identical to the second portion of the received password.

17. The method of claim 15, wherein the second portion comprises at least m bits, and a number of bits of the second portion increases by m bits for each increase of the first security level.

* * * * *